United States Patent [19]
Kuehnle

[11] Patent Number: 5,832,731
[45] Date of Patent: Nov. 10, 1998

[54] EXPANDABLE PISTON ROTARY MACHINE

[76] Inventor: Manfred R. Kuehnle, Waldesruh Rte. 103A P.O. Box 1020, New London, N.H. 03257

[21] Appl. No.: 740,751

[22] Filed: Nov. 1, 1996

[51] Int. Cl.$^6$ .................................................. F02B 71/04
[52] U.S. Cl. .............................. 60/595; 123/151; 417/380
[58] Field of Search .............................. 60/595; 123/151; 417/380

[56] References Cited

U.S. PATENT DOCUMENTS

| | | |
|---|---|---|
| 3,929,105 | 12/1975 | Chisholm . |
| 3,940,924 | 3/1976 | Miyada . |
| 3,975,122 | 8/1976 | Hackbarth et al. . |
| 4,022,168 | 5/1977 | Sprague . |
| 4,024,842 | 5/1977 | Dumaine . |
| 4,096,828 | 6/1978 | Staou et al. . |
| 4,503,817 | 3/1985 | Klomp et al. ...................... 123/151 X |
| 4,649,872 | 3/1987 | Solheim ............................. 123/151 X |
| 4,733,534 | 3/1988 | Southard ................................. 60/595 |
| 4,966,000 | 10/1990 | Wolters ................................... 60/595 |
| 5,000,135 | 3/1991 | Taguma ............................. 123/151 X |

Primary Examiner—Hoang Nguyen
Attorney, Agent, or Firm—Cesari and McKenna, LLP

[57] ABSTRACT

An expandable piston rotary engine includes a core having a substantially circular periphery and central axis, and a rotor/flywheel mounted concentrically for rotation relative to the core. The core defines a plurality of cylinders spaced symmetrically about, and open at, the periphery of the core. Each cylinder contains a radially expandable, substantially cylindrical piston formed of a relatively thin web of material, such as sapphire or amorphous steel. The piston web material is coiled about its associated cylinder axis, and defines an internal combustion chamber whose diameter, and volume, vary in response to a relative coiling and uncoiling of the web in its cylinder. The inner surface of the rotor/flywheel defines with the periphery of the core, the cylinders and the outer surfaces of the pistons a closed space for a hydraulic fluid. Intake and exhaust valves and fuel igniters are associated with each of the cylinders. The core and other engine components are formed of lightweight ceramic materials capable of withstanding very high operating temperatures. By driving the rotor shaft relative to the core, and changing the valving to the piston chambers, the engine may be converted for use as a compressor or fluid pump.

62 Claims, 4 Drawing Sheets

EXPANDABLE PISTON ROTARY MACHINE

BACKGROUND OF THE INVENTION

This invention relates generally to rotary motion machines, and more particularly, to an internal-combustion rotary engine that utilizes a unique radially expandable piston concept that provides high compression ratios and high operating efficiencies. The machine, which may also be driven in reverse and operated as a compressor or fluid pump, is fabricated from ceramic materials that are inexpensive, light in weight and capable of withstanding high operating temperatures.

Conventional internal-combustion reciprocating piston engines of the type that power most modern-day automobiles, boats and the like operate in either a four-stroke cycle or a two-stroke cycle. In the four-stroke cycle, also known as the Otto cycle, the four strokes are called, in order of sequence, intake, compression, power and exhaust. Intake is generally achieved by opening an intake valve in a cylinder head, and allowing an air/fuel mixture to be drawn into the cylinder as the piston in the cylinder moves downwardly to its bottom dead center position. The intake valve is then closed and the charge is compressed as the piston moves upwardly to its top dead center position. The charge is ignited during the latter part of the compression cycle, as a result of either its compression in the cylinder or a spark from a spark plug. The burning of the charge after ignition gives rise to the power stroke during which the engine performs work. The power stroke is characterized by a rapid increase in the temperature and pressure of the gases which expansion forces the piston downwardly in the direction of its bottom dead center position. Exhaust of the burnt gases is achieved by opening an exhaust valve in the cylinder head, and forcing the spent gases from the cylinder as the piston moves back to its top dead center position.

In engines having a two-stroke cycle, air is either pre-compressed prior to admission to the cylinders or admitted to the cylinders just before a compression stroke begins, the gases are ignited to begin a power stroke, and the burnt gases are exhausted near the end of the power stroke. The two-stroke engine therefore performs work every second stroke of the piston, unlike the four-stroke engine which performs work only once every fourth stroke of the piston. A two-stroke engine is often used where a small size is required and where the intermittent action of a four-stroke engine would require too large a flywheel to keep the engine running at nearly constant speed.

The efficiency of an internal combustion engine may be expressed in a number of different ways. One way is in terms of its compression ratio. The compression ratio of an engine is defined as the ratio of the volume of the gases in the engine's cylinders before compression to the volume of the gases after compression. Generally, the efficiency of an internal combustion engine increases with increasing compression ratio. In conventional reciprocating piston engines, compression ratios are typically in the range of about 4:1 to about 18:1, depending upon piston and cylinder design and dimensions. Compression ratios higher than this are difficult to achieve in practice due in large part to the fact that gas volumes vary during compression only linearly with piston displacement or stroke. Piston displacements or strokes are, in turn, limited by practical considerations, such as engine size, weight and cost.

The efficiency of an internal combustion engine may also be expressed in terms of its so-called Carnot cycle temperature ratio $(T_2-T_1)/T_2$, where $T_2$ is the maximum temperature to which the combustible gases are brought after ignition, and $T_1$ is the temperature of the gases after expansion at the end of the power stroke. It can thus be seen that engine efficiency can generally be increased by increasing the maximum temperature $T_2$ to which the gases are brought after ignition. Achieving as high a temperature as possible with the burning gases also guarantees that the fuel combustion is as rapid and complete as possible, thus minimizing unburnt charge emissions from the engine. Practical considerations, however, limit the temperatures that can be achieved during combustion in conventional engines. More specifically, as the maximum temperature of combustion $T_2$ in an engine increases, the steady state operating temperature of the engine also generally increases with time due to the limited ability of the engine's cooling system to carry away excess heat. The steady state operating temperature of the engine must be kept sufficiently below the softening points of the metals and metal alloys typically used for the fabrication of the critical engine components, such as the pistons, piston heads and cylinders, to avoid damage to such components during operation. This is particularly problematic in those cases where materials like aluminum and/or aluminum alloys are used to minimize the weight of the engine, since aluminum has a melting point of 660° C. and a softening point well below that.

Ceramic materials capable of withstanding relatively high temperatures have been used to coat piston heads, cylinder walls and other critical engine parts. Experimental studies with engines having parts coated with partially stabilized zirconia have shown that they are capable of producing higher fuel burning rates and higher fuel efficiencies due to their ability to operate safely at higher temperatures. However, the thin ceramic coatings are difficult and expensive to apply to metal parts. Also, because of their thinness, the coatings are susceptible to cracking and separation due to thermal and mechanical shocks, and have been thus found to have relatively limited useful lives.

Conventional reciprocating piston engines are also disadvantaged in that they require a cumbersome piston rod and crankshaft mechanism to convert the linear reciprocating motion of the pistons to rotary motion of an output shaft. Such crankshaft mechanisms are difficult to balance dynamically, and often the source of the excessive engine noise and vibration. They are also relatively inefficient mechanically since, at the two critical points in the conversion cycle, namely, piston top dead center and piston bottom dead center, the crank angle, and therefore the turning leverage of the piston rod on the crank of the crankshaft, are at a minimum. While conventional rotary engines, such as Wankel-type rotary engines utilized in some modern-day vehicles, eliminate these problematic crankshaft mechanisms, such engines nonetheless continue to suffer from essentially the same limitations as reciprocating piston engines in terms of achievable compression ratios and maximum operating temperatures.

It is, therefore, an object of this invention to provide an improved rotary motion machine.

It is another object of the invention to provide an improved rotary motion machine that may be configured as an internal-combustion engine, compressor or pump.

It is another object of the invention to provide an improved rotary motion internal-combustion engine that utilizes a unique radially expandable piston concept that permits the achievement of higher compression ratios and thus higher operating efficiencies.

It is another object of the invention to provide an improved rotary motion machine that uses hydraulic fluid such as oil as a hydrostatic propulsion means to move a common rotor/flywheel from cylinder to cylinder as it rotates.

It is another object of the invention to provide an improved internal-combustion engine that is fabricated from ceramic materials that permit the achievement of higher fuel combustion temperatures without damage to the engine parts, and thus higher operating efficiencies.

It is another object of the invention to provide an improved rotary motion internal-combustion engine of the type described that is characterized by lower specific fuel consumption, and a more complete and thus cleaner combustion process.

It is another object of the invention to provide an improved rotary motion internal-combustion engine of the type described having a compact construction, and a quieter, vibration- and noise-reduced operation.

It is still another object of the invention to provide an improved rotary motion internal-combustion engine of the type described that is light in weight and inexpensive to manufacture.

It is still yet another object of the invention to enable stacking of multiple internal combustion engines on top of each other, for example, to engage 4, 8, 12, 16 or more cylinders on one common drive shaft.

Other objects of the invention will be apparent to those skilled in the art from the following summary, drawing figures and detailed description of illustrative embodiments of the invention.

SUMMARY OF THE INVENTION

Briefly, a rotary motion machine embodied in accordance with the invention comprises one or more radially expandable pistons, each defining an internal chamber that has a volume that varies upon radial expansion and contraction of the piston. A core defines a cylinder for each piston. A rotor is mounted concentrically about the core, to permit relative rotation between the rotor and the core. The inner surface of the rotor includes means for coacting with the one or more radially expandable pistons, and defines, with the periphery of the core and the one or more cylinders, a space of a substantially constant volume for a relatively incompressible hydraulic fluid. Valves are associated with each of the cylinders to provide fluid communication to and from the piston internal chambers.

In accordance with an illustrative embodiment of the invention, the rotary motion machine of the invention is adapted for use as a two-stroke internal-combustion engine. The core defines a plurality of cylinders (e.g., four), each containing a radially expandable piston, and each being spaced about, and open at, the periphery of the core. Each of the pistons comprises a relatively thin web of material coiled about an axis that coincides with its associated cylinder axis. The radial expansion and contraction of the piston is effected by a relative uncoiling and coiling, respectively, of the web within its associated cylinder. Each cylinder is provided with an intake valve, an exhaust valve and a fuel mixture igniter. An expanding piston in one of the cylinders operating in a power stroke forces the hydraulic fluid out of the cylinder and into the hydraulic fluid space where it acts on bearing surfaces on the inner surface of the rotor, causing the rotor to rotate relative to the core. The hydraulic fluid forced out of the first cylinder enters a second adjacent cylinder operating in an exhaust stroke, where it in turn forces the piston in that second cylinder to contract in preparation to receive a new charge. A sequential firing of each cylinder around the periphery of the engine gives rise to a substantially uniform rotation of the rotor about the core.

Relatively high compression ratios are readily achievable with an engine embodied in accordance with this invention because the volume of the internal chamber of each radially expandable piston varies with the square of its diameter, rather than linearly with piston displacement as in conventional reciprocating piston engines. The radially expandable pistons are also preferably formed of high temperature, fatigue-free materials such as sapphire or amorphous steel, while the core and rotor are preferably formed of high temperature ceramic materials. Such materials permit the achievement of higher fuel combustion temperatures both because they are capable of withstanding higher temperatures and because they are better able to dissipate excess heat to the ambient atmosphere and/or the engine's cooling system than conventional engine part metals. Such higher fuel combustion temperatures, when combined with higher compression ratios, yield improved overall operating efficiencies, lower specific fuel consumption rates, and a generally cleaner, reduced emissions combustion process.

Expandable piston rotary engines embodied in accordance with the invention are also light in weight and compact in design. They require no crankshaft mechanism, and thus have none of the noise, vibration and mechanical inefficiency problems inherent in such mechanisms. Moreover, they are characterized by flexibility of design. For example, a single engine embodied in accordance with the invention may be used to drive either a single output shaft or a plurality of output shafts, depending on the particular application to which the engine is put. Similarly, it is possible to stack a plurality of engines embodied in accordance with the invention together, and to use them to drive a single output shaft for those applications in which a high specific power output is required.

As discussed below, the rotor of the rotary motion machine of the invention may also be driven relative to the core from an external power source, and the valving to the piston chambers changed, to adapt the machine for use as a compressor or fluid pump. Furthermore, if the "rotor" is held stationary, then the core of the machine can rotate through the action of the pistons in the cylinders relative to the rotor, pushing hydraulically against the bearing surfaces on the inner surface of the rotor to propel a common shaft mounted coaxially to the core.

BRIEF DESCRIPTION OF THE DRAWINGS

The foregoing and other features and advantages of the invention will be better understood from the following detailed description taken in conjunction with the accompanying drawings, in which.

DETAILED DESCRIPTION OF PREFERRED EMBODIMENTS OF THE INVENTION

Figure 1:
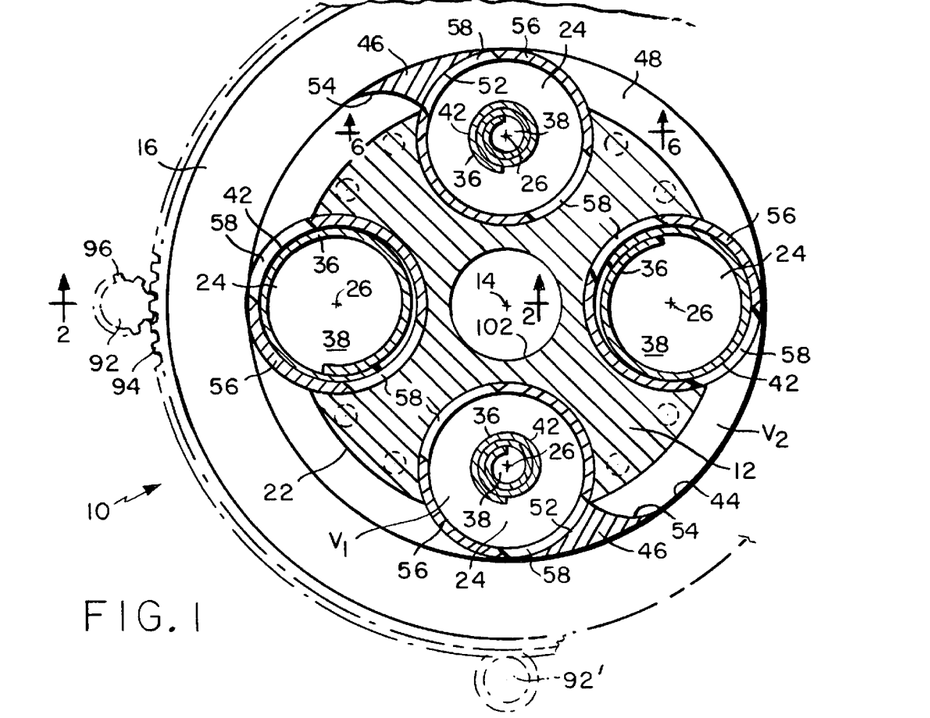
FIG. 1 is a cross-sectional view of an internal-combustion engine embodied in accordance with the invention.
Figure 2:
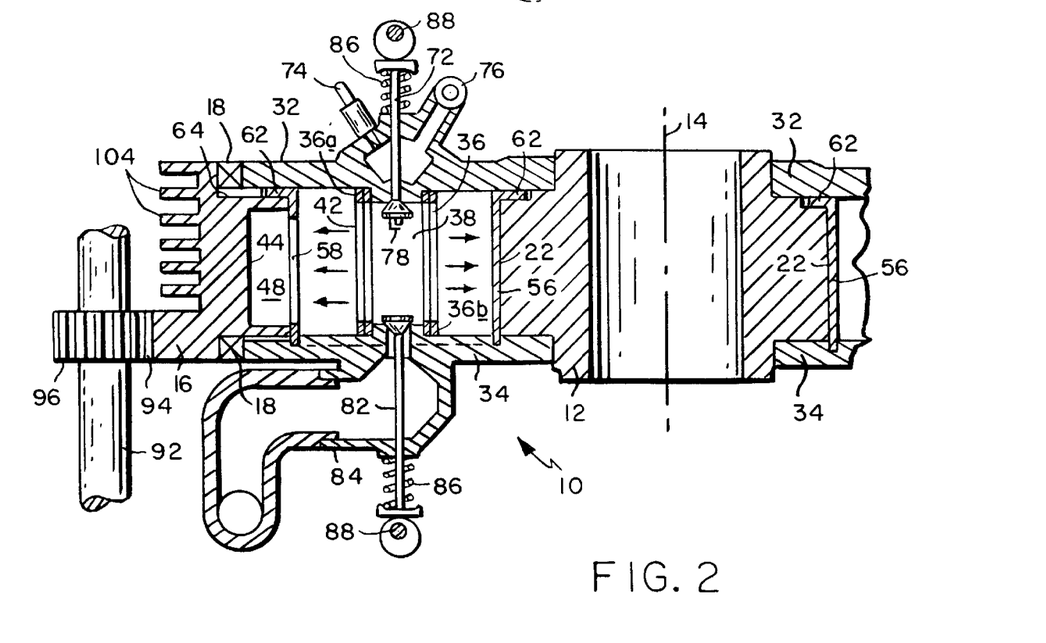
FIG. 2 is a side view, partly in section, of the internal combustion engine of FIG. 1, taken along the line 2—2 in FIG. 1.

Referring now to the drawings, and initially to FIGS. 1 and 2 thereof, there is shown an internal-combustion engine 10 embodied in accordance with the present invention. The engine 10 includes a core 12 having a generally cylindrical shape and a central axis 14. A rotor/flywheel 16 is mounted concentrically for rotation about the core 12. The rotor/flywheel 16 rotates on ball bearings 18 (FIG. 2) relative to the core 12, about core axis 14. The core 12 has an outer peripheral surface 22 which defines a plurality of cylinders 24, each with an axis 26 parallel to the core axis 14. Each cylinder 24 opens at the peripheral surface 22 of the core 12.

In the illustrative embodiment of the invention shown in FIG. 1, the engine 10 includes four cylinders 24 symmetrically disposed about the peripheral surface 22 of the core 12. It will be apparent to those skilled in the art that the engine 10 may be provided with any desired number of cylinders depending upon its intended application.

As best seen in FIG. 2, the core 12 includes an annularly shaped top core plate 32 and an annularly shaped bottom core plate 34. The core plates 32 and 34 define the top and bottom surfaces, respectively, of each cylinder 24. A radially expandable, generally cylindrical piston 36 is disposed coaxially in each cylinder 24. The top edge 36a of each piston 36 makes sliding contact with the top core plate 32, and the bottom edge 36b of each piston 36 makes sliding contact with the bottom core plate 34. Thus, each piston 36 defines a sealed internal chamber 38, the diameter and volume of which varies with the radial expansion and contraction of the piston 36 in its associated cylinder 24. Each piston 36 also includes an outer peripheral surface 42 that approaches the walls of its associated cylinder 24 when the piston 36 is fully expanded, as shown in the left and right cylinders 24 in FIG. 1.

Each piston 36 is preferably formed of a relatively thin web of high temperature fatigue free material that is rolled or coiled into a generally cylindrical form about its axis. Thus, the radial expansion and contraction of each piston 36 is effected by a relative uncoiling and coiling, respectively, of the piston web material about its axis. The piston top edge 36a and bottom edge 36b are each preferably in the form of a lip seal of Teflon or other suitable low friction material which provides low friction sliding seal with the top core plate 32 and bottom core plate 34 for each piston 36.

As best seen in FIG. 1, the rotor/flywheel 16 of the engine 10 includes an inner peripheral surface 44 which defines one or more teeth 46 extending inwardly toward the core axis 14. In the illustrative embodiment shown here, the rotor/flywheel 16 includes two inwardly extending teeth 46 at diametrically opposite positions on the rotor/flywheel 16. The rotor/flywheel inner peripheral surface 44, the core outer peripheral surface 22, the top and bottom plates 32 and 34, and the piston outer peripheral surfaces 42 together define the boundaries of a sealed, substantially constant volume space 48 for a relatively incompressible hydraulic fluid such as oil. Because the space 48 has a substantially constant volume, the hydraulic fluid that flows out of one of the cylinders 24 due to the expansion of that cylinder's piston 36 will seek to fill another cylinder 24 whose piston 36 is not fully contracted.

Each tooth 46 on the inner peripheral surface 44 of the rotor flywheel 16 has a bearing surface 52 and an oppositely disposed pushing surface 54. The hydraulic fluid forced out of one of the cylinders 24 due to the expansion of that cylinder's piston 36 (e.g., out of the top and bottom cylinders 24 in FIG. 1) bears against the rotor/flywheel tooth bearing surface 52 to cause the rotor/flywheel 16 to rotate relative to the core 12. As the rotor/flywheel 16 rotates, the pushing surface 54 on the tooth 46 pushes the hydraulic fluid in the space 48 ahead of it in the direction of the next adjacent cylinder 24 (e.g., the left and right cylinders 24 in FIG. 1) where the fluid forces that cylinder's piston 36 to contract. By sequentially forcing the expansion of the pistons 36 in the cylinders 24 in a counterclockwise direction around the core 12, as seen in FIG. 1, the rotor/flywheel 16 rotates substantially uniformly, also in counterclockwise direction about the core 12. The rotor/flywheel 16 preferably has a substantial thickness in the transverse dimension of the plane of FIG. 2, and is preferably fabricated from a material having a substantial mass, so that its rotational inertia assists the rotor/flywheel 16 in achieving a nearly constant speed of rotation.

The hydraulic oil in the space 48 also serves as a lubricating medium. In operation, a thin layer of the oil forms between the top edge seal 36a and the top core plate 32 and the bottom edge seal 36b and the bottom core plate 34, thus facilitating the sliding contact of each piston 36 in its associated cylinder 24 during expansion and contraction. Similarly, a thin layer of the oil forms between the convolutions of each piston 36 so that the surfaces of the coiled piston web materials do not rub against each other. The oil thus also serves to negate the wrapping angle effect of the coiled or wound pistons 36.

As shown in FIGS. 1 and 2, each cylinder 24 is lined with a relatively thin sleeve 56 having one or more windows or ports 58 in its side walls. The sleeves 56 are designed to rotate in synchronization with the rotor/flywheel 16. In this manner, the sleeve ports 58 may be disposed preferentially to direct the hydraulic fluid out of a cylinder 24 whose piston 36 is expanding, as in the case of the top and bottom cylinders 24 in FIG. 1, or into a cylinder 24 whose piston 36 is contracting, as in the case of the left and right cylinders 24 in FIG. 1.

FIG. 2 illustrates one way of obtaining the desired synchronized rotation of the ported cylinder sleeves 56. Specifically, each sleeve 56 includes a ring gear 62 secured to its upper end which meshes with an inwardly looking ring gear 64 carried by rotor/flywheel 16. Rotation of the rotor/flywheel 16 about the core 12 thus causes a corresponding rotation of each cylinder sleeve 56 in its associated cylinder 24. By properly selecting the diameter of the sleeve ring gears 62 in relation to the diameter of the rotor/flywheel ring gear 64, and by properly selecting the size and positioning of the ports 58 on the sleeves 56, the sleeve ports 58 can be made to assume the desired angular orientation in each cylinder 24 depending on whether that cylinder's piston 36 is expanding or contracting.

Other mechanisms for achieving the desired angular orientation of the cylinder sleeves 56 will suggest themselves to those skilled in the art. For example, the sleeves 56 may be biased by springs in one angular orientation, and detents on the inner surface of the rotor/flywheel 16 may engage the sleeves 56, displace them to the desired second angular orientation and then release the sleeves 56 so that the springs return them to their original angular orientation.

The engine 10 illustratively employs a two-stroke cycle of operation, with each cylinder 24 having a power stroke and an exhaust stroke. The top and bottom cylinders 24 in FIG. 1 are shown at the beginning of a power stroke. The left and right cylinders 24 in FIG. 1 are shown at the beginning of an exhaust stroke.

At the beginning of a power stroke, the piston 36 in the cylinder 24 is fully contracted, and the internal chamber 38 of the piston 36 contains a fresh charge of fuel and compressed air. The fuel/compressed air charge is admitted to the piston internal chamber 38 by briefly opening an intake valve 72 (FIG. 2) and allowing fuel from a fuel source (not shown) to flow through a fuel input nozzle 74, and compressed air from compressed air source (not shown) to flow through a compressed air input nozzle 76 into the piston internal chamber 38. The intake valve 72 is then closed and the fuel/compressed air charge is ignited electrically by a spark igniter 78 carried by the intake valve 72. The charge thus burns, causing a rapid radial expansion of the piston 36 in its cylinder 24. The radially expanding piston 36 performs work by forcing the hydraulic fluid that occupies cylinder 24 out of the cylinder 24 and against the bearing surfaces 52 on the rotor/flywheel teeth 46. The power cycle ends when the piston 36 reaches its maximum expansion and its outer surface 42 is in contact with or in close proximity to the inner surface of the cylinder sleeve 56. Preferably, the volume $V_1$ (FIG. 1) of the hydraulic fluid that is displaced from each cylinder 24 during a power stroke is substantially equal to the volume $V_2$ (FIG. 1) of hydraulic fluid contained in that portion of the space 48 between the rotor/flywheel tooth pushing surface 54 and the outer peripheral surface 42 of the next adjacent piston 36.

The exhaust stroke of the engine 10 begins after the completion of the power stroke. At the beginning of the exhaust stroke, the piston 36 is fully expanded in its cylinder 24 and the charge in the piston internal chamber 38 consists of spent or burnt gases. The hydraulic fluid that advances ahead of the rotor/flywheel pushing surface 54 enters the cylinder 24 and forces the piston 36 to contract radially. As the piston 36 is contracting, an exhaust valve 82 (FIG. 2) is opened, and the spent gases in the piston internal chambers 38 are forced out of the chamber 38 and into an exhaust manifold 84. The exhaust valve 82 is then closed to complete the exhaust stroke. The intake valve 72 is then opened to receive a new fuel/compressed air charge and to start a new cycle of operation.

As shown in FIG. 2, each of the intake valves 72 and exhaust valves 82 is biased in a closed position by a spring 86. For purposes of illustration, the valves 72 and 82 are shown as being opened and closed mechanically by cams carried by cam shafts shown schematically at 88. The details of such a mechanical valve control system, synchronized with the rotation of the rotor/flywheel 16, will be readily apparent to those skilled in the art, and are not critical to the present invention. Those skilled in the art will also appreciate that other valve control systems, such an electrical and/or electromechanical systems, could also be used to achieve the desired two-stroke cycle of operation discussed above.

As mentioned above, the spark igniter 78 is carried by the intake valve 72. Electrical current to activate the spark igniter 78 may be conducted through a discrete electrical contact (not shown) on the surface of the cam 88 that contacts the stem 72a (FIG. 6) of the intake valve 72 and through a coaxial conductive core 78a (FIG. 6) in the stem 72a of the intake valve 72 to the electrodes of the spark igniter 78 exposed at the head 72b (FIG. 6) of the intake valve 72. There are a couple of advantages that result from such a combined valve 72/igniter 78. First, it eliminates the need for a separate opening or port in the core top plate 32 above each cylinder 24 for a spark igniter 78. The core top plate 32 is thus not weakened near the head of each cylinder 24 due to the presence of multiple input ports. Secondly, by placing the spark igniter 78 directly on the end of the intake valve 72, the spark is placed closer to the center of the combustible charge. This provides a shortened ignition delay and a more uniform charge combustion process, both of which can result in improved fuel consumption and reduced unburnt charge emissions.

Obviously, the spark igniter 78 may be carried by or formed integrally with the exhaust valve 82 instead of the intake valve 72, with the attainment of the same advantages.

It will also be noted that the intake valves 72 and exhaust valves 82 are at opposite ends of each cylinder 24, (i.e., at the top and bottom, respectively, of each cylinder 24 as seen in FIG. 2.) This again avoids weakening of the core top plate 32 in the vicinity of the heads of the cylinders 24 due to the presence of multiple input ports there. In conventional reciprocating piston internal-combustion engines, there are at least three ports in the head of each cylinder, one for the intake valve, one for the exhaust valve and one for the spark igniter. Many conventional engines actually have more than one intake and exhaust valve per cylinder, making the weakening problem even more severe. The opposed intake and exhaust valves in the engine 10 also reduce turbulence in the cylinders 24, and generally facilitate the exhaust of burnt gases during the exhaust stroke. In fact, the intake valve 72 may be opened shortly before the exhaust valve 82 is closed near the end of the exhaust stroke and before any fuel is admitted to allow compressed air to flow into the internal chamber 38 of the piston 36, thus flushing any excess burnt gases out of the chamber 38 and into the exhaust manifold 84.

In the preferred embodiment of the invention, the cylinders 24 are actually fired in opposed pairs. More specifically, the top and bottom cylinders 24 in FIG. 1 are fired simultaneously. Then, a quarter turn of the rotor/flywheel 16 later, the left and right cylinders 24 in FIG. 1 are fired simultaneously. A quarter turn of the rotor/flywheel 16 after that, the top and bottom cylinders 24 are again fired simultaneously, and so on. Thus, during each power stroke, there are at least two cylinders 24 performing work simultaneously on the rotor/flywheel 16.

The rotary motion imparted to the rotor/flywheel 16 is transferred to an output shaft 92 for utilization. As seen in FIG. 2, the lower peripheral edge of the rotor/flywheel 16 is formed with a circumferential gear 94. The gear 94 in turn meshes with a gear 96 on the output shaft 92 to cause rotation of the same. As indicated in FIG. 1, a second output shaft 92' may be geared to the rotor/flywheel 16. Indeed, the engine 10 may be equipped with a plurality of output shafts, each dedicated to perform a different function.

The core 12 of the engine 10 is provided with a central channel 102 through which air or a liquid coolant is circulated to assist with cooling of the engine parts. A plurality of annular coolings fins 104 are also formed on the outer peripheral surface of the rotor/flywheel 16, above the circumferential gear 94, also for cooling purposes.

The volume of the internal chamber 38 of each piston 36 is proportional to the square of its diameter D. Thus, the compression ratio of the engine 10 is equal to the square of the ratio of the diameter $D_2$ of the internal chamber 38 of the piston 36 in its fully expanded position to the diameter $D_1$ of the internal chamber 38 of the piston 36 in its fully contracted position. This is to be contrasted with conventional reciprocating piston engines, in which compression ratios are only linearly proportional to the displacement, or stroke of the piston in its cylinder. Because of this relationship, compression ratios of 16:1 and higher are readily achievable with the engine 10. This simply requires that the ratio of $D_2/D_1$ of the piston diameters be about 4:1 or higher.

In a specific illustrative embodiment of the invention, the pistons 36, when fully contracted, have a diameter $D_1$ of about 2.0 centimeters, and when fully expanded, have a diameter $D_2$ of about 10.0 centimeters, yielding a compression ratio of 25:1.

Figure 3:
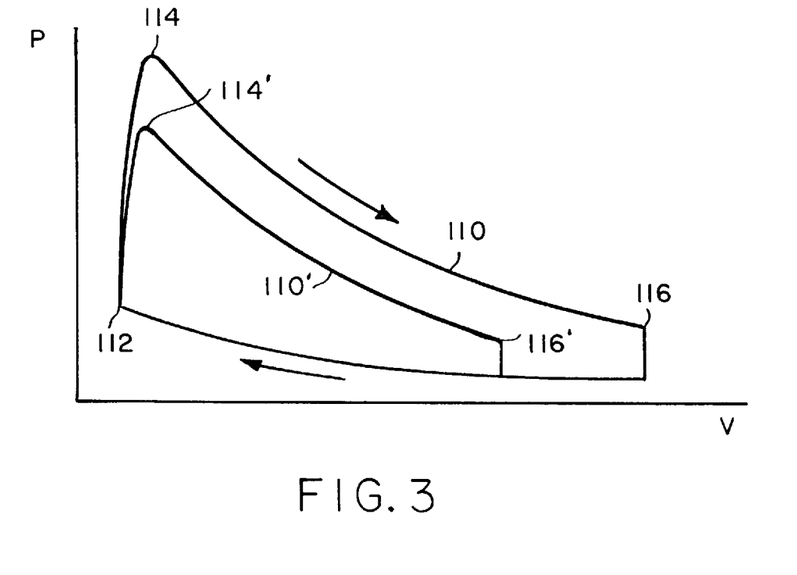
FIG. 3 is a plot of pressure versus volume for a cycle of a radially expandable piston engine embodied in accordance with the invention and for a similar cycle of a conventional reciprocating piston engine, and illustrating the advantage that the expandable piston engine has by virtue of its higher compression ratio.

FIG. 3 of the drawing compares a plot 110 of pressure P versus volume V for a cycle of an expandable piston engine such as the engine 10 described above, to a similar plot 110' for a cycle of a conventional reciprocating piston engine. The expandable piston engine is assumed to have a compression ratio of 25:1. The conventional reciprocating piston engine is assumed to have a compression ratio of about 15:1, which is near the high end of normal for such engines. Ignition of a compressed air/fuel change takes place at point 112 and expansion of that change as a result of its combustion starts at point 114 (114' in the case of the conventional engine). The expansion of the burning gases continues to the point 116 (116' in the case of the conventional engine) where the exhaust stroke begins. The cycle then repeats itself for each engine.

The work done in each cycle is given by the area of the closed cycle plot in each case. As can readily be seen from FIG. 3, the work done per cycle is considerably higher for the expandable piston engine than it is for the conventional engine. The thermodynamic efficiency η of the engine can be expressed as:

$$\eta = 1 - (1/\epsilon)^{\nu-1}$$

where $\epsilon$ is the compression ratio and $\nu$ is the ratio of the specific heat of the air/fuel charge at constant pressure to the specific heat of the air/fuel charge at constant volume. Since the specific heat ratio $\nu$ is typically greater than 1 for most air/fuel mixtures, it can be seen that the engine efficiency η increases with increased compression ratio $\epsilon$.

As noted previously, each piston 36 is formed of a relatively thin web of fatigue free material that is coiled about its cylinder axis 26 and that uncoils in response to the expansion of the burning fuel/air charge. The piston web material is also preferably selected to be a refractory capable of withstanding high fuel combustion temperatures and high steady-state operating temperatures without weakening or deforming in motion. There are at least a couple of classes of materials that meet these criteria. One suitable class includes elements such as sapphire and its synthetic equivalent, fused alumina. These materials have melting points above 2000° C., and may be shaped by conventional processes to the coiled, cylindrical form shown for the pistons 36. One conventional process for shaping these materials involves the use of fine sapphire or alumina powders mixed with a liquid binder, a combination that has rheological properties similar to those of clay which permit shaping. The mixture is pressed and rolled into the desired coiled configuration. Then, the fine particles in the mixture are agglomerated into a cohesive final product by heat treatment. Other suitable materials of this general class include crystalline carbon and graphite.

A second class of suitable materials includes amorphous steels, which are conventional high carbon content steels that are repeatedly annealed and roll-pressed at high temperatures. These materials can be formed in thin sheets which are rolled and heat-treated to resiliently retain the coiled, cylindrical form shown for the pistons 36. They also have melting points above 2000° C., and are thus capable of withstanding very high operating temperatures.

Similarly, the other components of the engine 10, such as the core 12, rotor/flywheel 16, core top and bottom plates 32 and 34 and cylinder sleeves 56 are preferably fabricated from high temperature ceramic materials. In the case of the rotor/flywheel 16, the material selected preferably has a relatively high density so that the rotor/flywheel 16 has a sufficient mass to assist in maintaining a substantially constant speed of rotation of the same relative to the core 12 during operation of the engine 10. Metalloceramics and other ceramic materials impregnated with particles of density-enhancing materials such as silicon, chromium, sintered steel or tungsten, are suitable for this purpose.

In a specific illustrative embodiment of the invention, the core 12 and core top and bottom plates 32 and 34 are formed from alumina, the cylinder sleeves 56 are formed from sapphire, and the rotor/flywheel 16 is formed from an alumina/chromium ceramic mixture.

The use of such ceramics permit the engine 10 not only to be light-in-weight, but also to sustain much higher fuel combustion temperatures and much higher steady-state operating temperatures than conventional engines fabricated from metals and metal alloys. In fact, the principal limiting factor on the maximum steady-state operating temperatures reachable with the engine 10 is the boiling point of the hydraulic fluid that fills the space 48 i.e., around 600° C. for most conventional hydraulic fluids. This is because the ceramic and other materials used in the engine 10 have melting points well above that. The ceramics materials are also essentially transparent to infrared, and thus serve as superior conductors of excess heat from the piston's internal chambers 38 to the ambient atmosphere and/or the engine's coolant. This has the effect of keeping the steady-state operating temperature of the engine 10 low even though the maximum fuel consumption temperatures within each cylinder 24 may be quite high.

Figure 4:
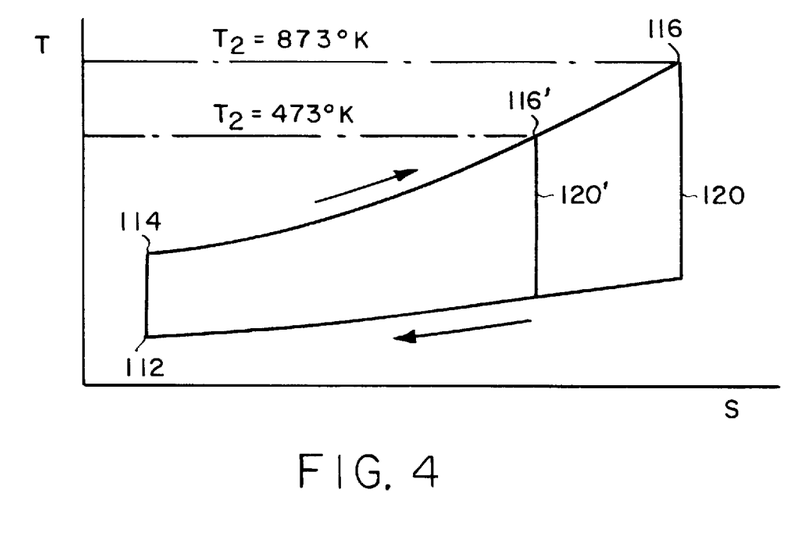
FIG. 4 is a plot of absolute temperature versus entropy for a cycle of a radially expandable piston engine embodied in accordance with the invention and for a similar cycle of a conventional reciprocating piston engine, and illustrating the advantage that the expandable piston engine has by virtue of its ability to sustain higher fuel combustion temperatures and higher steady-state operating temperatures.

FIG. 4 of the drawing compares a plot 120 of absolute temperature T in degrees Kelvin versus entropy S for a cycle of an expandable piston engine such as the engine 10 described above, to a similar plot 120' for a cycle of a conventional reciprocating piston engine. The conventional engine is assumed to have a maximum steady state operating temperature of about 200° C. (473° K), which is in the normal range and is adequately below the softening points of conventional engine part metals. The expandable piston engine is assumed to have a steady-state operating temperature of about 600° C. (873° K), slightly below the boiling point of conventional hydraulic oils.

Again, the work done in each cycle is given by the area of the closed cycle plot in each case. As is apparent, the work done per cycle by, and thus the thermodynamic efficiency of, the expandable piston engine, are considerably greater than they are for the conventional engine.

Figure 5:
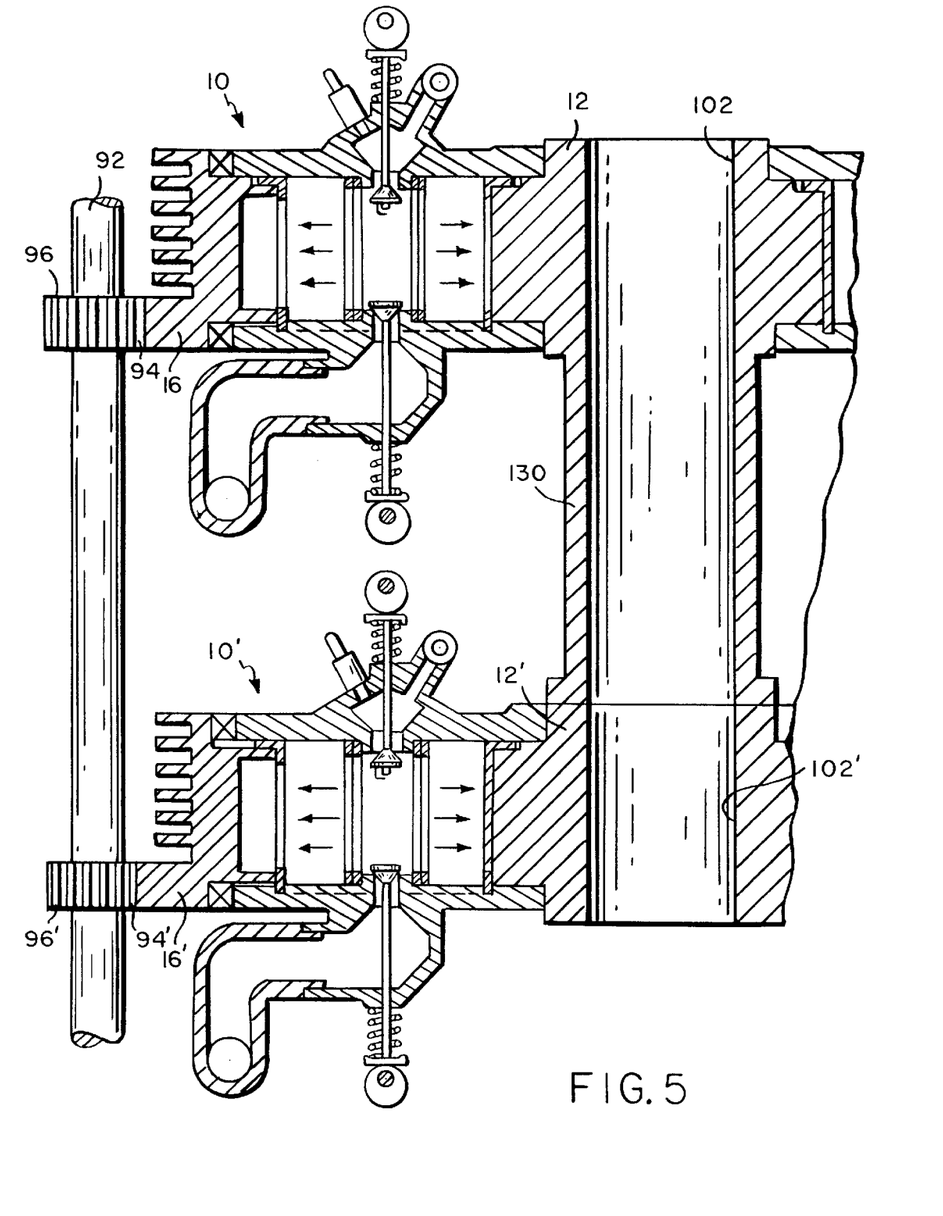
FIG. 5 is a side view, partly in section, showing two internal-combustion engines embodied in accordance with the invention stacked together to drive a single output shaft.

As indicated in FIG. 1, the engine 10 may be used to drive a plurality of output shafts 92 and 92'. As shown in FIG. 5 of the drawing, two or more engines 10 may also be stacked together to drive a single output shaft 92. Specifically, in FIG. 5, engine 10 and engine 10', which is illustratively identical to engine 10, have their respective cores 12 and 12' secured together by a flanged stacking tube 130. The tube 130 allows the air or liquid coolant that passes through the channel 102 of core 12 to be conducted to and through the corresponding channel 102' of the core 12', where it cools engine 10'. The rotor/flywheel 16' of engine 10' includes a corresponding circumferential gear 94' that engages a second gear 96' on the output shaft 92. Both engines 10 and 10' thus provide power output to the shaft 92. In this way, any multiple of four cylinders may be combined and used to power a common output shaft. Total horsepower and torque at the output shaft 92 may thus be increased in incremental multiples of the per engine horsepower and torque values.

As noted previously, the top edges 36a and bottom edges 36b of the pistons 36b are preferably in the form of Teflon lip seals that make sliding contact through a thin layer of oil with the top core plate 32 and bottom core plate 34, respectively. As the temperature of the pistons 36 increases, however, they will each experience a slight degree of axial elongation, which can result in increased friction at the edge seals, and in extreme cases, damage to the seals 36a and 36b and/or jamming of the piston 36 in its cylinder 24.

Figure 6:
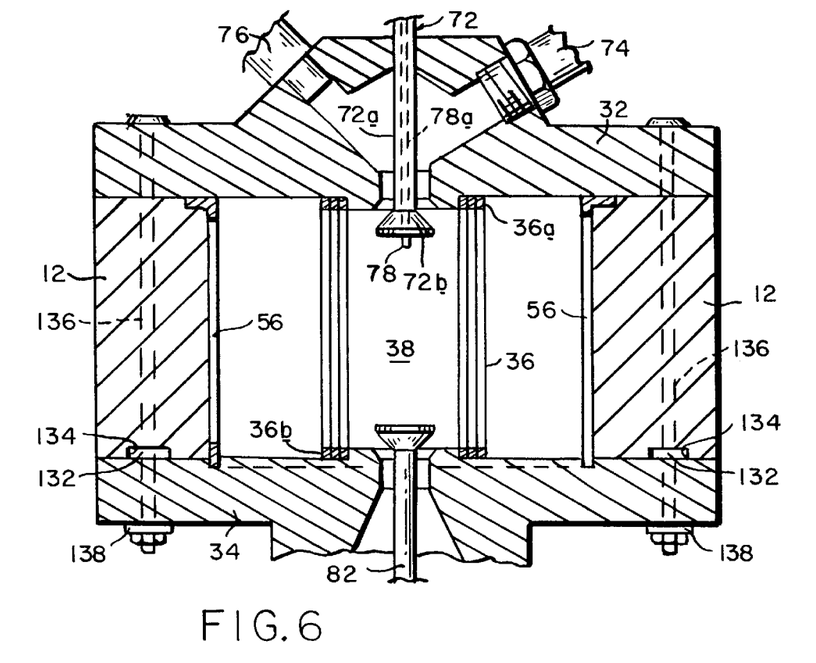
FIG. 6 is a cross-sectional view of one of the cylinders of the internal-combustion engine of FIGS. 1 and 2, taken along the line 6—6 in FIG. 1.

FIG. 6 of the drawing shows further details of one of the cylinders 24 of the engine 10, viewed along the line labeled 6—6 in FIG. 1, including specifically one way of compensating for slight axial elongations of the pistons 36 at elevated temperatures. Specifically, a piezoelectric spacer or washer 132 is mounted in each of a pair of recesses 134 formed in the bottom surface of the core 12 on opposite sides of each cylinder 24. The spacers/washers 132 for each cylinder 24 are shown in phantom in FIG. 1. The spacers/washers 132 are on bolts 136 that secure the top and bottom core plates 32 and 34 to the core 12. The piezoelectric material of the spacers/washers 132 is selected to have a coefficient of thermal expansion substantially equal to that of the material from which the pistons 36 are fabricated. Thus, slight elongations of the pistons 36 at high operating temperatures cause correspondingly slight downward movements of the bottom core plate 34 relative to the core 12 and correspondingly slight increases in the height of each cylinder 24 to compensate for the elongations. Resilient washers 138 at the bottom surface of the bottom core plate 34 take up any expansion experienced by the spacer/washers 134 at elevated temperatures.

Similar temperature-responsive spacer/washers may be provided between the top core plate 32 and core 12.

Figure 7:
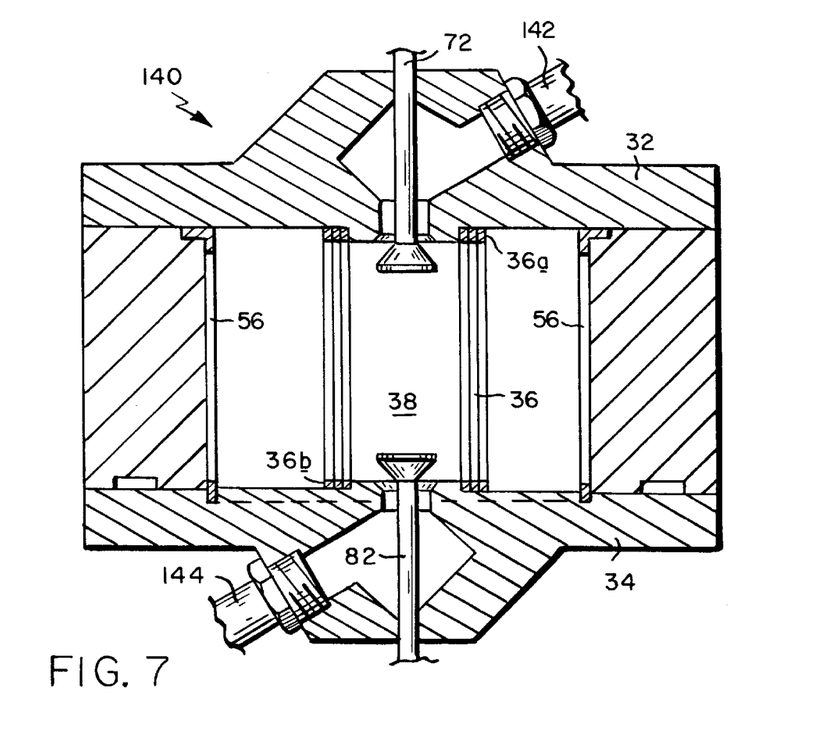
FIG. 7 is a cross-sectional view similar to that of FIG. 6, but showing the rotary machine of the invention adapted for use as a compressor or fluid pump.

The description so far has been directed to the preferred embodiment of the rotary motion machine of the invention, namely, the internal combustion engine 10 which delivers output power to an output shaft 92. However, those skilled in the art will appreciate that the machine of the invention may also be operated in reverse and embodied as a compressor or fluid pump. FIG. 7 of the drawing illustrates schematically a cylinder 24 of one such embodiment in the form of compressor/pump 140. The parts of the compressor/pump 140 that are substantially identical to those of the engine 10 are labeled with the same reference numerals in FIG. 7.

Referring to FIG. 7, the compressor/pump 140 includes a fluid inlet 142 providing fluid communication to the internal chamber 38 of the piston 36 through the top core plate 32. It also includes an axially opposed fluid outlet 144 providing fluid communication out of the piston internal chamber 38 through bottom core plate 32. Access to and out of the piston internal chamber 38 is provided by intake valve 72 and exhaust valve 82, respectively.

The remaining details of the compressor/pump 140 are essentially identical to those described above and shown in FIGS. 1 and 2 for the engine 10. The key difference is that, in the case of compressor/pump 140, the rotor/flywheel 16 is driven in rotation relative to the core 12 from an external source (not shown), such as an electric motor, internal-combustion engine or the like. The rotor/flywheel teeth 46 act against the hydraulic fluid that fills the space 48, forcing the hydraulic fluid into and out of the cylinders 24, in turn causing the pistons 36 in each cylinder 24 to expand and contract radially.

The compressor/pump 140 acts as either a compressor or a pump depending upon whether the fluid that is admitted to the piston internal chambers 38 is compressible, such as air, or incompressible, such as water, and depending upon when in its cycle of operation the exhaust valves 82 are opened. In either case, the intake valve 72 is opened when the piston 36 is in its fully expanded position, the exhaust valve 82 is closed and the fluid in question is allowed to fill the piston internal chamber 38. The intake valve is then closed. In the case where the fluid is compressible, and the compressor/pump 140 is being used as a compressor, the intake valve 72 and exhaust valve 82 are kept closed while the piston 36 moves to its fully contracted position, thus compressing the fluid that fills the piston internal chamber 38. The exhaust valve 82 is then opened, and the compressed fluid outputted through fluid outlet 144 to a relatively high pressure fluid reservoir (not shown). In the case where the admitted fluid is incompressible and the compressor/pump 140 is being used as a pump, the intake valve 72 is closed and the exhaust valve 82 is opened as the piston 36 starts moving to its fully contracted position. The contraction of the piston 36 causes the fluid that fills the piston internal chamber 38 to be conducted out of the chamber 38 through fluid outlet 144 to a suitable output reservoir (not shown).

The foregoing detailed description has been directed to specific embodiments of the invention. It will be apparent, however, that other variations and modifications may be made to the described embodiments, with the attainment of some or all of their advantages mentioned above. For example, although for each of the embodiments described above, the core 12 is shown as being stationary and the rotor/flywheel 16 is shown rotating relative to the core 12, those skilled in the art will appreciate that there may be embodiments which hold the "rotor/flywheel" 16 stationary and rotate, or cause the rotation of, the core 12 and cylinders relative to the rotor/flywheel 16. In such a configuration shaft may be mounted coaxially to the rotating core, and used either as an output shaft in the case where the machine is being used as an engine, or as an input shaft in the case where the machine is being used as a compressor/pump. Therefore, it is the object of the appended claims to cover all such variations and modifications as come within the true spirit and scope of the invention.

What is claimed is:

1. A rotary motion machine comprising:
    a. one or more radially expandable pistons, each of said pistons defining an internal chamber of a volume that varies upon radial expansion and contraction of said piston;
    b. a core having a periphery and defining a cylinder for each of said pistons;
    c. a rotor mounted about said core to permit relative rotation between said rotor and said core, said rotor having an inner surface that is spaced from the periphery of said core and that includes means for coacting with said one or more radially expandable pistons, said inner surface of said rotor, said periphery of said core and said one or more cylinders defining a space for a hydraulic fluid; and d. valve means cooperatively arranged with each of said one or more cylinders for providing fluid communication to and from said one or more piston internal chambers.

2. The rotary machine of claim 1 in which said coacting means on the inner surface of said rotor includes one or more teeth projecting inwardly from said inner surface into the hydraulic fluid space, each of said teeth providing a bearing surface for said hydraulic fluid.

3. The rotary motion machine of claim 1 in which each of said pistons comprises a web of material coiled about a central axis, the radial expansion and contraction of said piston being effected by a relative uncoiling and coiling, respectively, of said web within its said cylinder.

4. The rotary motion machine of claim 1 further including ignition means cooperatively arranged with each of said cylinders for igniting combustible gases in said piston chambers during a power stroke of said cylinders, whereby said machine is adapted for use as an internal-combustion engine.

5. The rotary motion machine of claim 1 further including means for rotating said rotor relative to said core to compress a relatively compressible fluid in said piston chambers during a compression stroke of said cylinders, whereby said machine is adapted for use as a compressor.

6. The rotary motion machine of claim 5 wherein said fluid being compressed is air.

7. The rotary motion machine of claim 1 further including fluid input means and fluid output means communicating with said valve means, and means for rotating said rotor relative to said core to force fluid from said input means to said piston chambers and from said piston chambers to said output means, whereby said machine is adapted for use as a fluid pump.

8. The rotary motion machine of claim 1 in which each of said cylinders has opposed top and bottom surfaces, and in which said valve means include intake valve means in one of said top and bottom surfaces of each of said cylinders and exhaust valve means in the other of said top and bottom surfaces of each of said cylinders so that, in each of said cylinders, said intake valve means axially oppose said exhaust valve means.

9. The rotary motion machine of claim 8 further including means for igniting combustible gases in said piston chambers, said igniting means being formed integrally with either said intake valve means or said exhaust valve means.

10. The rotary motion machine of claim 1 in which said piston material is sapphire.

11. The rotary motion machine of claim 1 in which said piston material is amorphous steel.

12. The rotary motion machine of claim 1 wherein said core is formed of a ceramic material.

13. The rotary motion machine of claim 1 wherein said rotor is formed of a density-enhanced ceramic material.

14. The rotary motion machine of claim 1 in which said hydraulic fluid space is filled with oil.

15. The rotary motion machine of claim 3 in which said hydraulic fluid space is filled with oil and in which said oil lubricates said web of said piston to facilitate the relative uncoiling and coiling of said web.

16. The rotary machine of claim 1 in which each of said cylinders has opposed top and bottom surfaces and in which each of said pistons includes top and bottom lip seals which sealingly contact said top and bottom surfaces of said cylinder, respectively.

17. The rotary machine of claim 16 in which said hydraulic fluid space is filled with oil and in which said oil lubricates said piston lip seals to facilitate sliding contact with said top and bottom surfaces of said cylinder.

18. The rotary motion machine of claim 1 further including a shaft mounted for rotation with said rotor.

19. The rotary motion machine of claim 1 further including a plurality of shafts mounted for rotation with said rotor.

20. The rotary motion machine of claim 1 in combination with one or more additional like machines mounted for rotation with a common shaft.

21. The rotary motion machine of claim 1 in which said rotor is held stationary and in which said core rotates relative to said rotor.

22. An expandable piston rotary engine comprising:

a. a core having a periphery and a central axis, said core defining a plurality of cylinders spaced about, and open at, the periphery of said core, each of said cylinders having a cylinder wall and an axis parallel to said core axis;

b. a rotor/flywheel mounted concentrically for rotation relative to said core about said core axis, said rotor/flywheel having an inner surface that is spaced from the periphery of said core;

c. an expandable, substantially cylindrical piston in each of said cylinders, each of said pistons defining an internal-combustion chamber and an outer peripheral surface, each of said pistons being radially expandable within its said cylinder between a contracted position and an expanded position;

d. a space of substantially constant volume defined by said outer peripheral surfaces of said pistons, the inner surface of said rotor/flywheel, said cylinder walls and the periphery of said core for containing a relatively incompressible hydraulic fluid;

e. intake and exhaust valve means cooperatively arranged with each of said cylinders for admitting and exhausting gases to and from said piston chambers; and f. ignition means cooperatively arranged with each of said cylinders for igniting gases in said piston chambers, whereby, during a power stroke of one of said cylinders, said piston is expanded to force said hydraulic fluid out of said cylinder in a direction to cause relative rotation between said core and said rotor/flywheel, and whereby, during an exhaust stroke of an adjacent one of said cylinders, said hydraulic fluid compresses said piston to its contracted position.

23. The expandable piston rotary engine of claim 22 in which said rotor/flywheel includes one or more teeth projecting inwardly from its inner surface into said hydraulic fluid space, each of said teeth defining a bearing surface for said hydraulic fluid to facilitate relative rotation between said core and said rotor/flywheel.

24. The expandable piston rotary engine of claim 22 in which said core is held in a stationary position and said rotor/flywheel rotates axially about said core during operation of said engine.

25. The expandable piston rotary engine of claim 22 in which each of said cylinder walls is lined with a substantially cylindrical sleeve having at least one port for providing a flow path for said hydraulic fluid between said hydraulic fluid space and said cylinders.

26. The expandable piston rotary engine of claim 25 in which said rotor/flywheel has a direction of rotation relative to said core and in which each of said sleeves is rotatable relative to its said cylinder about said cylinder axis so that during a power stroke said port on said sleeve is positioned in a first angular position to direct said hydraulic fluid with a component generally in the direction of the rotor/flywheel rotation, and during an exhaust stroke said port on said sleeve is positioned in a second angular position to receive said hydraulic fluid flowing in the direction of the rotor/flywheel rotation.

27. The expandable piston rotary engine of claim 26 in which said rotor/flywheel includes an inwardly extending ring gear that engages with an outwardly extending ring gear formed on each of said sleeves, whereby rotation of said rotor/flywheel causes corresponding rotation of said sleeves in their associated cylinders.

28. The expandable piston rotary engine of claim 22 in which each of said pistons comprises a relatively thin web of material coiled about an axis that coincides with the axis of its said cylinder, the radial expansion of each said piston being effected by a relative uncoiling of said web within its said cylinder.

29. The expandable piston rotary engine of claim 22 in which said core further includes a top core plate and a bottom core plate each having a substantially circular periphery complementary to that of said core, said top core plate defining a top surface for each of said cylinders and said bottom plate defining a bottom core surface for each of said cylinders.

30. The expandable piston rotary engine of claim 22 further including means for supplying fuel to said internal chambers of said pistons through said intake valve means.

31. The expandable piston rotary engine of claim 22 further including means for supplying compressed air to said internal chambers of said pistons through said intake valve means.

32. The expandable piston rotary engine of claim 22 in which each said piston when in its said expanded position has a diameter $D_2$ and in which each said piston when in its said contracted position has a diameter $D_1$, and in which the ratio $D_2/D_1$ is at least about 4:1.

33. The expandable piston rotary engine of claim 22 in which said rotor/flywheel has sufficient mass to permit a substantially uniform speed of rotation of said rotor/flywheel relative to said core during operation of said engine.

34. The expandable piston rotary engine of claim 28 in which said piston material is sapphire.

35. The expandable piston rotary engine of claim 28 in which said piston material is amorphous steel.

36. The expandable piston rotary engine of claim 33 in which said rotor/flywheel is formed of a density-enhanced ceramic material.

37. The expandable piston rotary engine of claim 36 in which said rotor/flywheel is formed of alumina impregnated with a density-enhancing material selected from the group consisting of silicon, chromium, sintered steel and tungsten.

38. The expandable piston rotary engine of claim 22 in which said core is formed of a relatively lightweight ceramic material.

39. The expandable piston rotary engine of claim 38 in which said core is formed of alumina.

40. The expandable piston rotary engine of claim 29 in which said top core plate and said bottom core plate are formed of a relatively lightweight ceramic material.

41. The expandable piston rotary engine of claim 25 in which each of said sleeves is formed of a high temperature ceramic material.

42. The expandable piston rotary engine of claim 41 in which each of said sleeves is formed of sapphire.

43. The expandable piston rotary engine of claim 29 in which said intake valve means provide fluid communication with said internal chambers of said pistons through a port in said top core plate, and said exhaust valve means provide fluid communication with said internal chambers of said pistons through a port in said bottom core plate.

44. The expandable piston rotary engine of claim 29 in which said exhaust valve means provide fluid communication with said internal chambers of said pistons through a port in said top core plate, and said intake valve means provide fluid communication with said internal chambers of said pistons through a port in said bottom core plate.

45. The expandable piston rotary engine of claim 22 in which said ignition means is formed integrally with said exhaust valve means.

46. The expandable piston rotary engine of claim 22 in which said ignition means is formed integrally with said intake valve means.

47. The expandable piston rotary engine of claim 22 in which said core defines a channel through which air or a liquid coolant is circulated to assist in cooling said engine during operation.

48. The expandable piston rotary engine of claim 29 in which said core, said top core plate and said bottom core plate define a central axial channel through which air or a liquid coolant is circulated to assist in cooling said engine during operation.

49. The expandable piston rotary engine of claim 22 in which said rotor/flywheel has an outer surface defining a plurality of annular cooling fins to facilitate the removal of heat from said engine core, cylinders and pistons during operation of said engine.

50. The expandable piston rotary engine of claim 22 further including means for compensating for axial elongation of said pistons in said cylinders during operation of said engine at elevated temperatures.

51. The expandable piston rotary engine of claim 29 in which each of said cylinders has an axial height defined by said top core plate and said bottom core plate, and further including means for adjusting the axial height of said cylinders in response to axial elongation of said pistons in said cylinders during operation of said engine at elevated temperatures.

52. The expandable piston engine of claim 51 in which said adjusting means comprise a piezoelectric member having a coefficient of thermal expansion substantially equal to the coefficient of thermal expansion of said pistons.

53. The expandable piston engine of claim 52 in which said adjusting means comprise a piezoelectric spacer/washer interposed between said core on the one hand and one of said top core plate and said bottom core plate on the other hand.

54. The expandable piston rotary engine of claim 22 in which said hydraulic fluid space is filled with oil.

55. The expandable piston rotary engine of claim 28 in which said hydraulic fluid space is filled with oil and in which said oil lubricates said web of said piston to facilitate the relative uncoiling of said web within its said cylinder.

56. The expandable piston rotary engine of claim 29 in which each of said pistons includes top and bottom lip seals which sealingly contact said top core plate and said bottom core plate, respectively.

57. The expandable piston rotary engine of claim 56 in which said hydraulic fluid space is filled with oil and in which said oil lubricates said piston lip seals to facilitate sliding contact with said top core plate and said cotton core plate.

58. The expandable piston rotary engine of claim 24 in which an output shaft is mounted for rotation with said rotor/flywheel.

59. The expandable piston rotary engine of claim 24 in which a plurality of output shafts are mounted for rotation with said rotor/flywheel.

60. The expandable piston rotary engine of claim 22 in combination with one or more additional like engines mounted in multiples to drive a common output shaft.

61. The expandable piston rotary engine of claim 22 in which said rotor/flywheel is held in a stationary position and said core rotates axially about said core axis during operation of said engine.

62. The expandable piston rotary engine of claim 61 in which an output shaft is coaxially mounted for rotation with said core.

* * * * *